United States Patent [15] 3,699,552
De Fabritis et al. [45] Oct. 17, 1972

[54] MAGNETIC BUBBLE DEVICE AND METHOD OF MANUFACTURE

[72] Inventors: Raymond P. De Fabritis; Gerald Burt Fefferman, both of Parsippany; Bruce David Gesner, Dover; Raymond John Radner, Chester, all of N.J.

[73] Assignee: Bell Telephone Laboratories, Incorporated, Murray Hill, N.J.

[22] Filed: Dec. 30, 1970

[21] Appl. No.: 102,794

[52] U.S. Cl.........................340/174 TF, 340/174 YC
[51] Int. Cl..............................................G11c 11/14
[58] Field of Search....340/174 CC, 174 YC, 174 TF

[56] References Cited

UNITED STATES PATENTS

| | | | |
|---|---|---|---|
| 3,534,341 | 10/1970 | Sherwood et al. | 340/174 TF |
| 3,564,518 | 2/1971 | Fischer | 340/174 TF |
| 3,530,444 | 9/1970 | Bobeck et al. | 340/174 TF |
| 3,603,939 | 9/1971 | Bobeck et al. | 340/174 TF |
| 3,599,189 | 8/1971 | Hadden, Jr. et al. | 340/174 CC |

OTHER PUBLICATIONS

IBM Technical Disclosure Bulletin " Fan-Out for Bubble Domain Devices" by Almasi, Vol. 13, No. 6, 11/70, p. 1409.

*Primary Examiner*—Stanley M. Urynowicz, Jr.
*Attorney*—R. J. Guenther and Edwin B. Cave

[57] ABSTRACT

For a magnetic bubble device, circuitry and support structure is disclosed which employs a glaze layer. The glaze isolates two layers of control conductors from each other, supports a magnetic bubble crystal, houses a Hall-effect device and is transparent to allow transmission of polarized light for bubble observation and detection purposes.

3 Claims, 3 Drawing Figures

INVENTORS R.P. DE FABRITIS
G.B. FEFFERMAN
B.D. GESNER
R.J. RADNER
BY Charles E. Graves
ATTORNEY

MAGNETIC BUBBLE DEVICE AND METHOD OF MANUFACTURE

FIELD OF THE INVENTION

This invention relates to magnetic bubble devices and specifically to the construction of associated circuit paths and support structure for a suitable magnetic bubble crystal.

BACKGROUND OF THE INVENTION

In the patent issued Aug. 5, 1969 to A. H. Bobeck et al. U.S. Pat. No. 3,460,116, there is described a general class of devices formed of sheets in which magnetic domains, or bubbles, are created, manipulated, and annihilated. The manipulations can comprise logic, memory, switching, and counting functions, all within the one continuous medium of the magnetic sheet. The latter consists in general of any crystal exhibiting magnetic uniaxial anisotropy; and hereinafter is termed a sheet or a crystal.

The creation and detection of the magnetic bubbles in a practical device occasionally impose certain requirements on its overall construction which are not readily met by reference to standard techniques of microelectronic circuit preparation. For example, if the magnetic bubbles are to be detected by their external optical effect, any structure required to be between the external detector and the illuminating light source, must be optically transmissive. Furthermore, it may be desirable for the same structure to isolate conductive paths from each other, to support the crystal, and to be amenable to bonding operations. Additionally, the substrate on which the device is constructed must be compatible with any deposited films used in the process.

A further requirement of the device circuitry involves the function known as "replication." Here, the two overlapping conductive loops which comprise the replicator must be mechanically stable and yet readily manufactured in paths of the order of 1.5 mils wide with 1-mil spacing consistent throughout the loop.

Accordingly one object of the invention is to fabricate inexpensive, reliable magnetic bubble devices.

An added object of the invention is to support the crystal of such a device in a way that facilitates optical detection of the bubbles and yet is amenable to metallization processes for forming circuit paths.

A further object of the invention is to permit bonding of external leads to such a device without weakening or optically clouding the structure.

A specific object of the invention is to prepare narrow, closely and evenly spaced conductive paths for a magnetic bubble memory device.

SUMMARY OF THE INVENTION

In broadest terms, the invention involves a glaze layer used as an insulator between two conductor layers of a magnetic bubble circuit which performs conventional replication, detection and annihilation functions. The glaze serves not only as an insulating layer but as a rigid support for the crystal. Its transparency readily permits transmission of polarized light necessary to detect the presence or absence of a magnetic bubble optically.

Advantageously, a transparent substrate for the circuitry is selected to have a thermal coefficient of expansion similar to that of the glaze, thus to assure a stress-free glaze layer for support of the crystal.

The bottom conductor metallization is formed by the thermal decomposition of a mixture of metallo-organic compounds known as resinates. The mixture is fired pursuant to a specific time-temperature cycle, resulting in a metal film. To this an additional gold layer is then electroplated. The bottom conductors are photolithographically defined thereafter, and the unwanted metal etched away.

Then, glass in the form of a suitable paste is applied as the insulating layer, and air-fired according to a second time-temperature cycle. The shape of the glaze insulating layer then is photolithographically defined and the unwanted glass etched away.

The top conductors thereafter are formed by a vacuum-deposited gold layer over a vacuum-deposited chromium layer. Advantageously, an additional gold layer is then electroplated on top. The top conductor pattern is defined photolithographically, and the unwanted chromium and gold etched away using etchants which do not deleteriously affect the glaze.

The invention and its further objects, features and advantages will be readily apprehended from a reading of the description to follow of illustrative embodiments.

DETAILED DESCRIPTION OF ILLUSTRATIVE EMBODIMENTS

Figure 5:
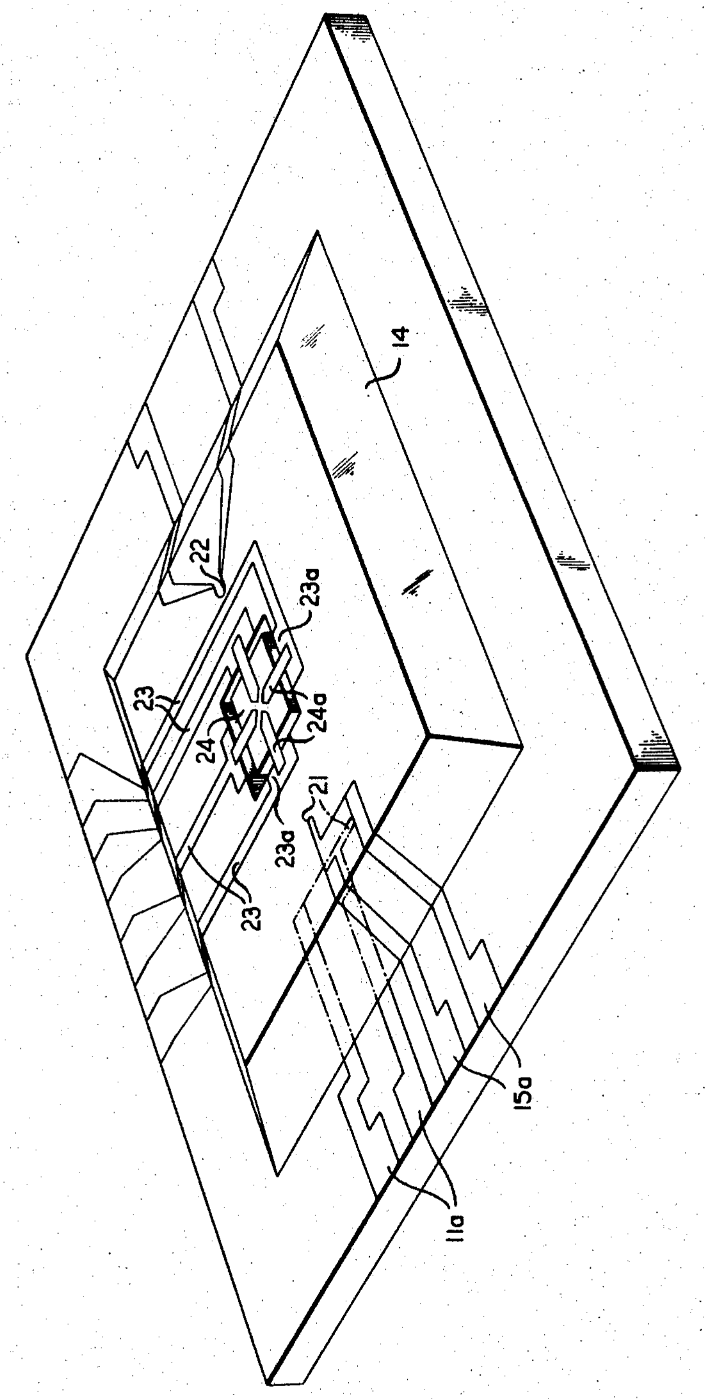
FIG. 5 is a schematic top perspective diagram of a second inventive embodiment.

Glass insulation is placed between the top and bottom conductive layers of a magnetic bubble circuit using a combination of film deposition techniques. An exemplary structure made pursuant to the invention is depicted in FIG. 5. It comprises a glass substrate 10, a bottom conductive path 12 (bottom cross-loop) with associated pads 11, the glaze layer 14, top conductive paths 20, (top cross-loop) with pads 15; a crystal 18 with copper pad leads 17 and circuitry **18*a*. In the general discussion to follow, these components will be referred to. A thick film glass is used to isolate the bottom and top conductors from each other. Since bubble detection is desirable by optical means, the supporting substrate is optically transmissive. A soda-lime glass for the substrate 10** has been found to retain transparency and shape during processing. Sapphire is another suitable substrate material.

The bottom conductive paths 12 are formed by gold electroplating on a conductive metal foundation layer $3 \times 10^3$ A thick, formed by the thermal decomposition of a mixture of metallo-organic compounds commonly termed resinates. As used herein, the term "resinate" means any salt or ester of a resin acid, or a mixture of such acids. Included in this general compound class are constituents of naturally occurring resinates, resin exudations from trees, and synthetic preparations. In addition to the discussion to follow, further details as to the resinate mixture, its composition, and preparation in connection with the present invention are found in the U.S. Pat. No. 3,617,341 No. 862,480 of applicant G. B. Fefferman, filed Sept. 30, 1969 which is hereby incorporated by reference.

The insulating layer 14 of glass in a suitable paste form is, for example, screen-printed upon the prepared bottom conductor, and air-fired according to a time-temperature cycle that causes no noticeable stress in the base substrate nor changes the characteristics of the bottom conductor. At the same time, however, the firing provides a smooth, transparent and rigid insulating layer.

For the top conductive path 20, the vacuum-deposited gold and chromium top conductive layer with its additional electroplated gold is treated photolithographically for defining the top conductor pattern. Advantageously, bonding of external copper ribbon leads to the pads or land areas 11 and 15 is achieved by use of solder preforms using a 10 percent rosin-alcohol flux.

In the following general examples, the inventive process is demonstrated through its application to the construction of, first, a cross-loop magnetic bubble replicator; and secondly, a magnetic bubble device with detection and annihilation capability as well.

EXAMPLE 1

A glass substrate 10 nominally 0.0625 inch thick was supported upon an alumina substrate to obviate sagging in the high firing temperatures later used. The glass was a soda-lime composition.

A resinate mixture consisting of the following materials and parts by weight was prepared by thorough admixture:

One hundred parts by weight of "liquid bright gold" solution containing 20 percent by weight of gold in resinate form;

0.265 parts by weight of bismuth resinate solution containing 20 percent by weight of bismuth in resinate form;

0.593 parts by weight of lead resinate solution containing 27.8 percent by weight of lead in resinate form;

0.630 parts by weight of silicon in resinate form; and 1.90 parts by weight of boron resinate solution containing 1.5 percent by weight of boron in resinate form.

The purpose of each individual resinate in the resinate mixture bears mentioning. Gold, of course, is the current-carrying metal. Lead, boron, and silicon form their respective oxides which combine to form a glass dispersion throughout the gold film, acting to bond the gold to the substrate. Without these resinates present, the latter electroplating would cause a complete loss of adhesion at the gold-substrate interface. Bismuth also forms an oxide and prevents blistering in subsequent firings.

The resulting mixture was applied to the glass substrate, as by spin-coating from a flooded start, at 630 rpm for 30 seconds. The spin-coated substrate was then dried at 160° F. for one hour in a standard, circulating air-drying oven to partially remove the thinners. Thereafter, the substrate was inserted in a furnace and fired in accordance with the time-temperature cycle of Table I below.

TABLE I

| Step | (°C) Start | Finish | (Minutes) Time of Step |
|---|---|---|---|
| 1 | room | 200 | 12 |
| 2 | 200 | 200 | 15 |
| 3 | 200 | 350 | 13 |
| 4 | 350 | 350 | 40 |
| 5 | 350 | 760 | 44 |
| 6 | 760 | 200 | gradual |
| 7 | remove substrates | | |

The cycle of Table I results in a continuous metallic film which is electrically conductive and exhibits sufficient adhesion to the substrate 10 to carry it through the processes to follow.

Figure 1:
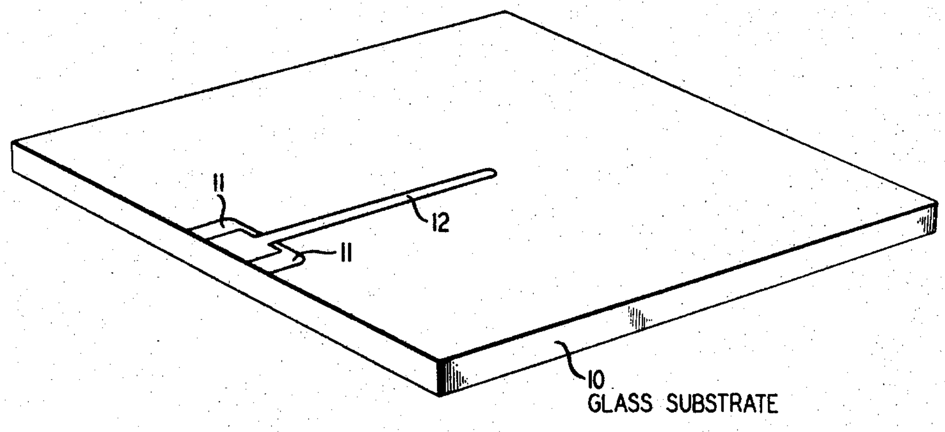
FIGS. 1–4 are all schematic top perspective diagrams of successive stages in the making of the device pursuant to the invention.

Firing pursuant to Table I resulted in a film $3 \times 10^3$ A thick. Then, the substrate was placed in a gold electroplating bath for electroplating of an additional $3 \times 10^4$ A of gold upon the decomposed resinate film. Next, the bottom conductive paths were photolithographically defined, and the unwanted gold etched away. The structure at this stage is depicted in FIG. 1, which shows the glass substrate 10 and the fully formed bottom conductor 11 with its loop 12 of two legs 1.5 mils wide and spaced 1.0 mil apart. The space or gap can, if desired, range from 0.3 mil to about 3 mils. The described shape and spacing are readily and consistently achieved pursuant to the invention as thus far described. The bottom conductor film has the properties of being able to withstand repeated exposure to high temperature, maintaining adhesion during electroplating, and the capability of being defined by a photoetch process.

Following this, a glass in paste form was screen-printed to the surface of the partial structure shown in FIG. 1 to a thickness of approximately 2 mils. The main glass constituents were 64.6 percent lead oxide, 19.6 percent silicon dioxide, 9.65 percent boron trioxide and 5.44 percent cadmium oxide. The glass paste is ¾ glass and ¼ organic binder and solvents. The entire surface was coated; and the coated substrate was air-fired in accordance with the time-temperature cycle in Table II below.

TABLE II

| Step | (°C) Start | (°C) Finish | (Minutes) Time of Step |
|---|---|---|---|
| 1 | room | 200 | 12 |
| 2 | 200 | 200 | 15 |
| 3 | 200 | 430 | 15 |
| 4 | 430 | 430 | 30 |
| 5 | 430 | 650 | 27 |
| 6 | 650 | 650 | 15 |
| 7 | 650 | 200 | gradual |
| 8 | remove substrates | | |

Pursuant to one aspect of the invention, the thermal coefficient of expansion of the glaze selected is sufficiently close to the thermal coefficient of expansion of substrate 10 to preclude the formation of thermal stresses in the structure.

With the air-firing as per Table II, the paste forms an insulating glass that is smooth, transparent, rigid, and about 0.001 inch thick. Thereafter, the insulating pattern or patch was photolithographically defined using a suitable positive-acting photoresist and etched by room temperature immersion, first, in a 4 percent hydrochloric acid solution, followed by immersion in a 20 percent potassium hydroxide solution. These do not attack the substrate or the bottom conductors.

Figure 2:
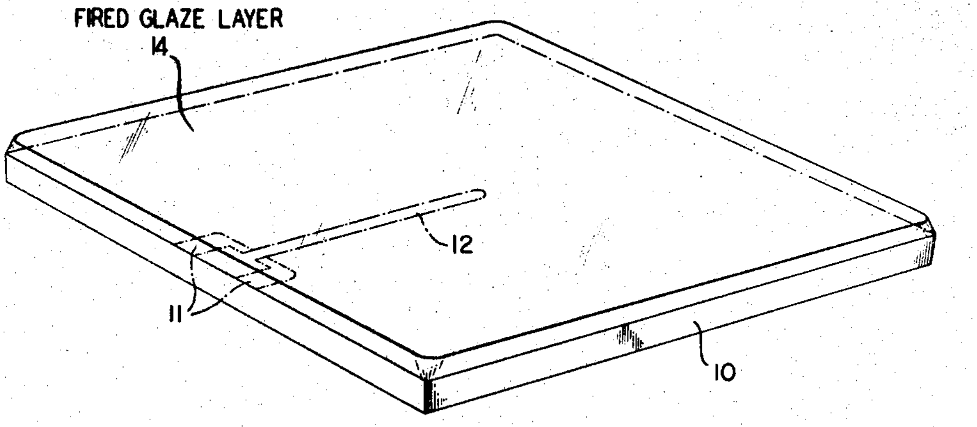
Figure 3:
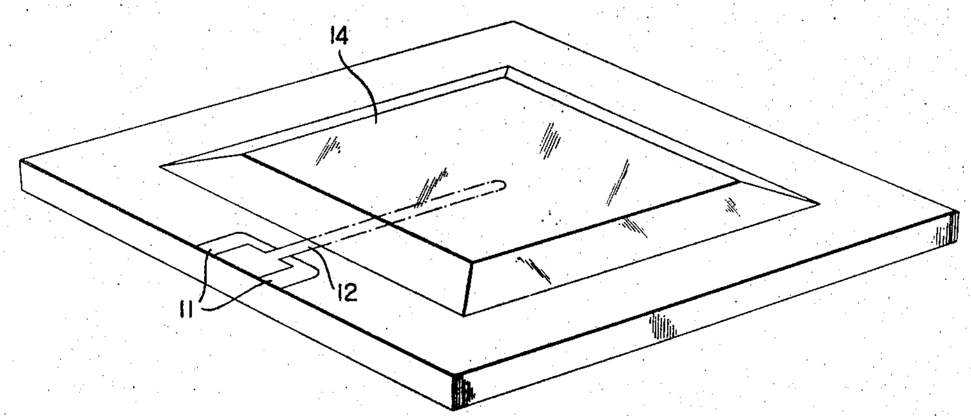

FIG. 2 shows the structure before etch; and FIG. 3, after etch. The insulating layer 14 as shown must be tapered at the edges to allow enough metal to adhere during the later vacuum deposit, as well as to avoid run-off of photoresist.

The top path 20 and pads 15, are formed by a vacuum deposited or sputtered gold layer over a suitable vacuum deposited or sputtered metallic adherence layer, such as chromium, titanium or nichrome. The metallic adherence layer, however, must be amenable to etchants that do not attack the underlying glaze layer 14.

Accordingly, a layer of chromium $3 \times 10^2$ A thick was vacuum-deposited upon the insulation 14, followed by a vacuum-deposited gold layer $2 \times 10^3$ A thick. Following this, the substrate was given an additional gold coat $3 \times 10^4$ A thick by electroplating. Then, the top conductor pattern was defined by photolithographic techniques and etched, using etchants for both gold and chromium which do not deleteriously affect the glaze film. The resulting structure following this etching step is depicted in FIG. 4.

Figure 4:
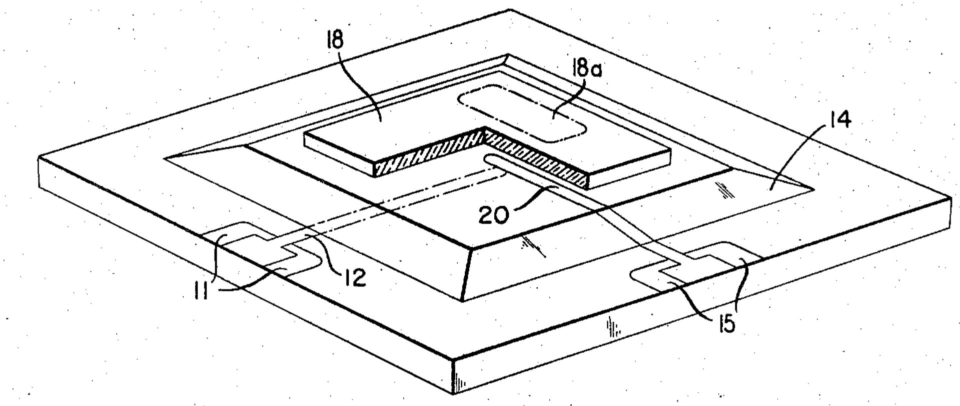

As further shown in FIG. 4, a sheet of, for example, orthoferrite crystal 18 is mounted atop the completed glaze layer 14, as by bonding or other means. Magnetic bubbles replicated by the loop circuitry 12 of the present invention are manipulated or propagated within the crystal or sheet 18 by means of magnetic propagation circuitry, denoted generally as **18*a*. This circuitry may be placed, for example, atop sheet 18; or alternatively may be placed upon unused areas of the completed glaze layer. The manner of placing the propagation circuitry, and the functions performed by such circuitry are not relevant to the present invention; but it is important to note that the surface of glaze layer 14** is amenable to support or receive such circuitry if desired.

A distinct further advantage of the insulating layer 14 is that its highly smooth surface permits excellent line definition, better than can be expected from more porous surfaces. Thus, circuits with more complex designs may readily be envisioned using this inventive process, as is illustrated in Example II to follow.

EXAMPLE II

In this example, a magnetic bubble device is constructed pursuant to the basic invention by incorporating an electric circuit that detects, replicates, and annihilates magnetic bubbles. Replication is achieved by the cross-loop technique described in Example I above. Detection is accomplished by a conventional Hall-effect device. Annihilation is achieved by a properly induced magnetic pulse.

The device of Example Ii is prepared by producing a bottom conductor on a glass substrate, as shown in FIG. 1, and by the steps enumerated in Example I. Similarly, glaze paste is applied and fired and thereafter photoresist is applied to the glaze, exposed, and developed; and the substrate is etched thereby to define the outer perimeter of the glaze patch, in the manner described in Example I, and referred-to in FIGS. 2 and 3. This etching advantageously is a two-step process using sequential immersions, first, in a 4 percent hydrochloric acid solution, and thereafter in a 20 percent potassium hydroxide solution.

Top conductors are constructed as in Example I, by vacuum-depositing a layer of chromium $3 \times 10^2$ A thick, followed by a vacuum deposition of a gold layer $2 \times 10^3$ A thick; and thereafter electroplating a gold layer $3 \times 10^4$ A thick. The top conductor pattern is defined photolithographically and both gold and chromium are etched using etchants which do not deleteriously affect the glaze.

FIG. 5 depicts the circuit structure at this point. The conductor pattern designated 21 is the cross-loop replicator, that designated 22 is the annihilator and the circuit designated 23 interconnects a Hall-effect detector 24. The path between the replicator and the annihilator, is the propagation path in which the magnetic bubbles travel.

After the top conductor gold is electroplated, photoresist is applied and developed to define the top conductor paths. The unwanted gold is removed by etchants that expose but do not attack the chromium in those regions. Next, further photoresist is applied to define the hole pattern in the glaze patch which is to receive a Hall-effect device. This photoresist then is exposed and developed, and the chromium etched to remove chromium from that hole pattern. Next, in a further etching step, the glaze exposed by the chromium etching step is removed by etching at room temperature with a 2 ½ percent hydrofluoric acid, 3 ½ percent nitric acid solution. The result is a steeper interior edge on glass layer than that obtained with the described etching procedure for the glazed outer edges. The steeper inner edge defining the hole is necessary to minimize undercutting of the glass beneath the bonding paths. Thereafter, the remaining chromium is etched away.

As seen in FIG. 5, the bonding pads **23*a* for the Hall detector circuit 24 cover an area substantially contiguous with the etched hole in the glaze. Additionally, the pads 23*a*** extend along at least half the periphery of each hole edge and are substantially centered at the midpoint of each edge.

The Hall device 24 seen in FIG. 5 includes four leads **24*a* extending outwardly 90° apart. In order for the top surface of device 24 to lie in the same plane as the top conductors 23, the glaze thickness is tailored to be equal to the height of device 24. The Hall device is bonded in place by thermocompression of the leads 24*a* onto the pads 23*a*. Bonding leads then are connected to the conductor land areas such as 11*a*, 15** on the glass substrate, advantageously by soldering copper ribbon leads (not shown) directly to the land areas with a 60/40 tin/lead solder preform.

Finally, a crystal such as crystal 19 is mounted with respect to the glaze area 14 in the manner already described, and as shown, in FIG. 4.

In summary, the glaze layer of the present invention isolates two layers of conductors from each other, supports magnetic crystal, houses a Hall-effect device, and furthermore is transparent to allow the transmission of polarized light for observation and magnetic bubble detection purposes.

It is to be understood that the embodiments described herein are merely illustrative of the principles of the invention. Various modifications may be made thereto by persons skilled in the art without departing from the spirit and scope of the invention.

What is claimed is:

1. A magnetic bubble device comprising:

a sheet medium consisting of a crystal having magnetic uniaxial anisotropy and capable of exhibiting magnetic domains;

electrical circuit means for manipulating said domains in said sheet, comprising:

an electrically inert glass substrate;

bottom conductive paths formed in a first multilayered metal film adhered to one surface of said substrate;

said first metal film being formed by thermal decomposition of a resinate mixture applied to said substrate and consisting of a gold resinate with traces of bismuth, lead, silicon, and boron resinates;

a glaze layer formed atop said bottom conductor paths formed by application of a glass paste atop said substrate and the formed bottom conductors, said paste comprising a major fraction of lead oxide, with minor fractions of silicon dioxide, boron trioxide and cadmium oxide, and top conductive paths formed in a second multilayered metal film adhered to said glaze layer and to said substrate;

said top and bottom paths being vertically isolated from each other by said glaze layer;

said sheet medium being mounted with one face entirely in close proximity to said top conductive paths.

2. A device pursuant to claim 1, wherein said bottom conductive path includes an elongated loop having legs 1.5 mils wide, separated by from 0.3 mil to 3 mils; and wherein said top conductive path comprises a second elongated loop of like dimensions crossing over said first loop at substantially right angles thereto at a point adjacent to the ends of both said loops.

3. A device pursuant to claim 2, further comprising gently tapered exterior edges on said glaze layer, the latter further comprising a rectangular cavity with steeply tapered interior edges; and wherein said top conductive paths comprise four lands each having a pad area adjacent to one of the edges of said cavity; and a Hall-effect device with four leads disposed at right angles to each other supported in said cavity by bonding of said leads to respective said pads.

* * * * *